(12) United States Patent
Hirose et al.

(10) Patent No.: US 9,091,197 B2
(45) Date of Patent: Jul. 28, 2015

(54) HONEYCOMB STRUCTURAL BODY

(75) Inventors: Shogo Hirose, Gifu (JP); Yukio Miyairi, Nagoya (JP); Eriko Kodama, Nagoya (JP); Hiroyuki Suenobu, Nagoya (JP); Koichi Sendo, Nagoya (JP); Yusuke Tsuchiya, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 601 days.

(21) Appl. No.: 13/206,863

(22) Filed: Aug. 10, 2011

(65) Prior Publication Data

US 2012/0064286 A1 Mar. 15, 2012

Related U.S. Application Data (60) Provisional application No. 61/378,992, filed on Sep. 1, 2010.

(51) Int. Cl.
*B01D 46/24* (2006.01)
*C04B 38/00* (2006.01)
*F01N 3/022* (2006.01)
*F01N 3/28* (2006.01)
*C04B 111/00* (2006.01)

(52) U.S. Cl.
CPC .......... *F01N 3/2828* (2013.01); *B01D 46/2425* (2013.01); *B01D 46/2429* (2013.01); *C04B 38/0006* (2013.01); *C04B 38/0009* (2013.01); *C04B 38/0096* (2013.01); *B01D 2046/2433* (2013.01); *B01D 2046/2437* (2013.01); *B01D 2239/1216* (2013.01); *B01D 2255/50* (2013.01); *B01D 2255/9155* (2013.01); *C04B 2111/0081* (2013.01); *Y10T 428/24149* (2015.01)

(58) Field of Classification Search
USPC .......... 428/116–118; 422/169–172, 177–180, 422/181, 182; 55/522–524; 502/439
See application file for complete search history.

(56) References Cited

U.S. PATENT DOCUMENTS

| | | | | |
|---|---|---|---|---|
| 4,934,142 | A * | 6/1990 | Hayashi et al. | 422/169 |
| 5,108,716 | A * | 4/1992 | Nishizawa | 422/180 |
| 5,948,376 | A * | 9/1999 | Miyoshi et al. | 502/304 |
| 7,276,276 | B2 | 10/2007 | Noguchi et al. | |
| 2008/0070776 | A1* | 3/2008 | Yamaguchi | 502/100 |
| 2011/0252773 | A1* | 10/2011 | Arnold et al. | 60/297 |

FOREIGN PATENT DOCUMENTS

| | | |
|---|---|---|
| EP | 1 985 352 A2 | 10/2008 |
| EP | 2 108 494 A2 | 10/2009 |
| EP | 2 158 956 A1 | 3/2010 |
| EP | 2 216 085 A1 | 8/2010 |
| JP | 4246475 B2 | 4/2009 |
| JP | 2009-242133 A1 | 10/2009 |

* cited by examiner

*Primary Examiner* — David Sample
*Assistant Examiner* — Nicholas W Jordan
(74) *Attorney, Agent, or Firm* — Burr & Brown, PLLC (57) ABSTRACT

A honeycomb structural body includes porous partition walls arranged to form a plurality of cells which become through channels of a fluid, porosities of the partition walls are from 45 to 70%, a pore diameter distribution of the partition walls is measured by mercury porosimetry, the pore diameter distribution indicates a bimodal distribution, in the bimodal distribution, a pore diameter at the maximum peak value of a small pore side distribution is from 1 to 10 μm, and a pore diameter at the maximum peak value of a large pore side distribution exceeds 10 μm, and a ratio between a pore volume of the small pores and a pore volume of the large pores is in a range of 1:7 to 1:1 in the honeycomb structural body.

17 Claims, 10 Drawing Sheets

HONEYCOMB STRUCTURAL BODY

BACKGROUND OF THE INVENTION

1. Field of the Invention

The present invention relates to a honeycomb structural body and, more particularly, it relates to a honeycomb structural body which can preferably be used as a catalyst carrier and onto which a large amount of catalyst can be loaded while maintaining a strength of the body.

2. Description of Related Art

Heretofore, there has been suggested an exhaust gas purifying device in which a catalyst for purification is loaded onto a catalyst carrier, to remove components such as nitrogen oxides ($NO_x$) from an exhaust gas to be purified discharged from stationary engines for an automobile and a construction machine, an industrial stationary engine, a combustion apparatus and the like. As this catalyst carrier for the exhaust gas purifying device, there is used, for example, a honeycomb structural body including porous partition walls arranged to form a plurality of cells which become through channels of a fluid (see e.g. Patent Documents 1 and 2). The catalyst for purification is loaded onto the surfaces of the porous partition walls of the honeycomb structural body and into pores thereof.

In recent years, it has been considered that porosities of the partition walls of the honeycomb structural body are raised to increase the amount of the catalyst to be loaded onto the honeycomb structural body.

PRIOR ART DOCUMENTS

Patent Documents

Patent Document 1 JP-A-2009-242133
Patent Document 2 JP4246475

SUMMARY OF THE INVENTION

Problem to be Solved by the Invention

However, when porosities of partition walls of a honeycomb structural body are only simply raised, catalyst loading properties can be enhanced, but there has been a problem that it becomes remarkably difficult to maintain a necessary strength of a catalyst carrier. In consequence, there is an antinomy (trade-off) relation between the enhancement of the catalyst loading properties (in other words, to increase an amount of a catalyst which can be loaded onto the partition walls) and the enhancement of the strength of the honeycomb structural body (in other words, to maintain the necessary strength of the catalyst carrier), and it has been remarkably difficult to establish both of the enhancements.

The present invention has been developed in view of the above problem, and an object thereof is to provide a honeycomb structural body which can preferably be used as a catalyst carrier and onto which a large amount of catalyst can be loaded while maintaining the strength of the body.

Means for Solving the Problem

According to the present invention, the following honeycomb structural body is provided.

[1] A honeycomb structural body comprising: porous partition walls arranged to form a plurality of cells which become through channels of a fluid, wherein porosities of the partition walls are from 45 to 70%, a pore diameter distribution of the partition walls is measured by mercury porosimetry, the pore diameter distribution indicates a bimodal distribution, in the bimodal distribution, a pore diameter at the maximum peak value of a small pore side distribution is from 1 to 10 μm and a pore diameter at the maximum peak value of a large pore side distribution exceeds 10 μm and a ratio between a pore volume of the small pores and a pore volume of the large pores is in a range of 1:7 to 1:1.

[2] The honeycomb structural body according to the above [1], wherein the pore diameter at the maximum peak value of the large pore side distribution exceeds 10 μm and is 200 μm or smaller.

[3] The honeycomb structural body according to the above [1] or [2], wherein a thickness of each of the partition walls is from 0.060 to 0.288 mm.

[4] The honeycomb structural body according to any one of the above [1] to [3], wherein the partition walls are made of a material containing at least one ceramic component selected from the group consisting of silicon carbide, a silicon-silicon carbide based composite material, cordierite, mullite, alumina, spinel, a silicon carbide-cordierite based composite material, lithium aluminum silicate, and aluminum titanate.

[5] The honeycomb structural body according to any one of the above [1] to [4], wherein a cell density of the honeycomb structural body is from 15 to 140 cells/$cm^2$.

Effect of the Invention

A honeycomb structural body of the present invention comprises porous partition walls arranged to form a plurality of cells which become through channels of a fluid, porosities of the partition walls are from 45 to 70%, a pore diameter distribution of the partition walls is measured by mercury porosimetry, the pore diameter distribution indicates a bimodal distribution due to pore diameter distributions of small and large pores, in this bimodal distribution, a pore diameter at the maximum peak value of a small pore side distribution is from 1 to 10 μm, and a pore diameter at the maximum peak value of a large pore side distribution exceeds 10 μm, and a ratio between a pore volume of the small pores and a pore volume of the large pores is in a range of 1:7 to 1:1. Therefore, a large amount of catalyst can be loaded, while maintaining a strength of the body. That is, in the conventional honeycomb structural body, the enhancement of catalyst loading properties and the enhancement of the strength of the honeycomb structural body have an antinomy (trade-off) relation, and it has been remarkably difficult to establish both of the enhancements. Since the pore diameter distribution is the above specific bimodal distribution, it is possible to enhance the catalyst loading properties, while maintaining the strength of the body.

DETAILED DESCRIPTION OF THE INVENTION

Hereinafter, embodiments of the present invention will specifically be described with reference to the drawings, but it should be understood that the present invention is not limited to the following embodiments and that the following embodiments appropriately subjected to change, improvement and the like on the basis of the ordinary knowledge of a person skilled in the art are included in the present invention, without departing from the scope of the present invention.

Figure 1:
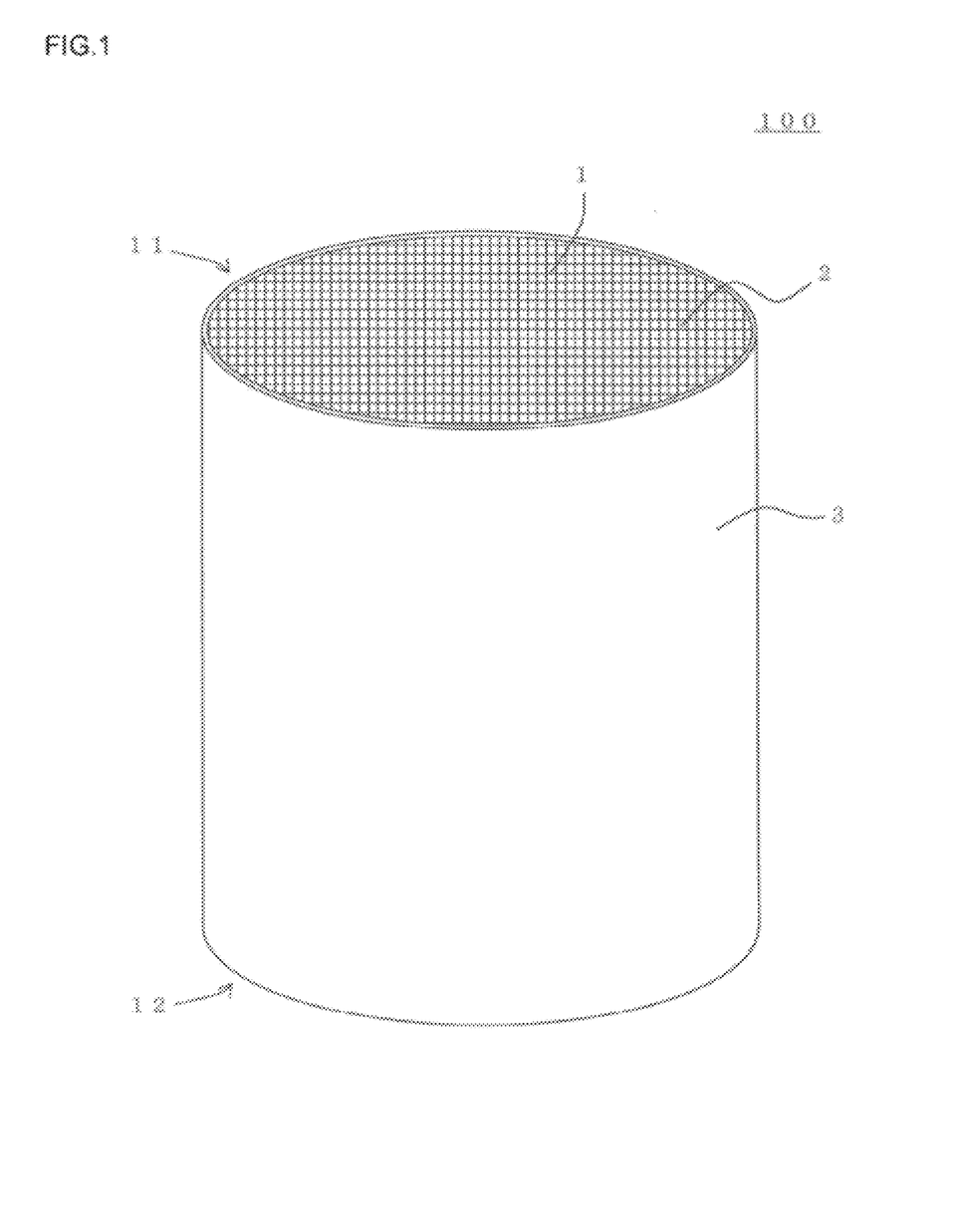
FIG. 1 is a perspective view schematically showing an embodiment of a honeycomb structural body of the present invention.
Figure 2:
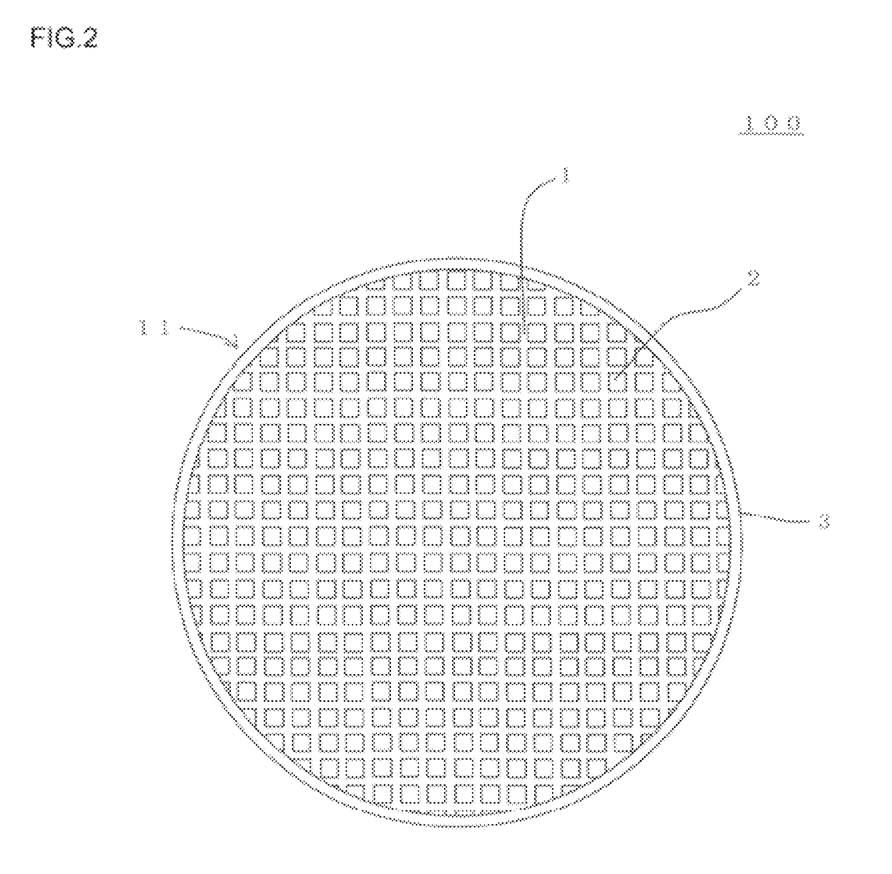
FIG. 2 is a plan view showing one end surface side of the embodiment of the honeycomb structural body of the present invention.
Figure 3:
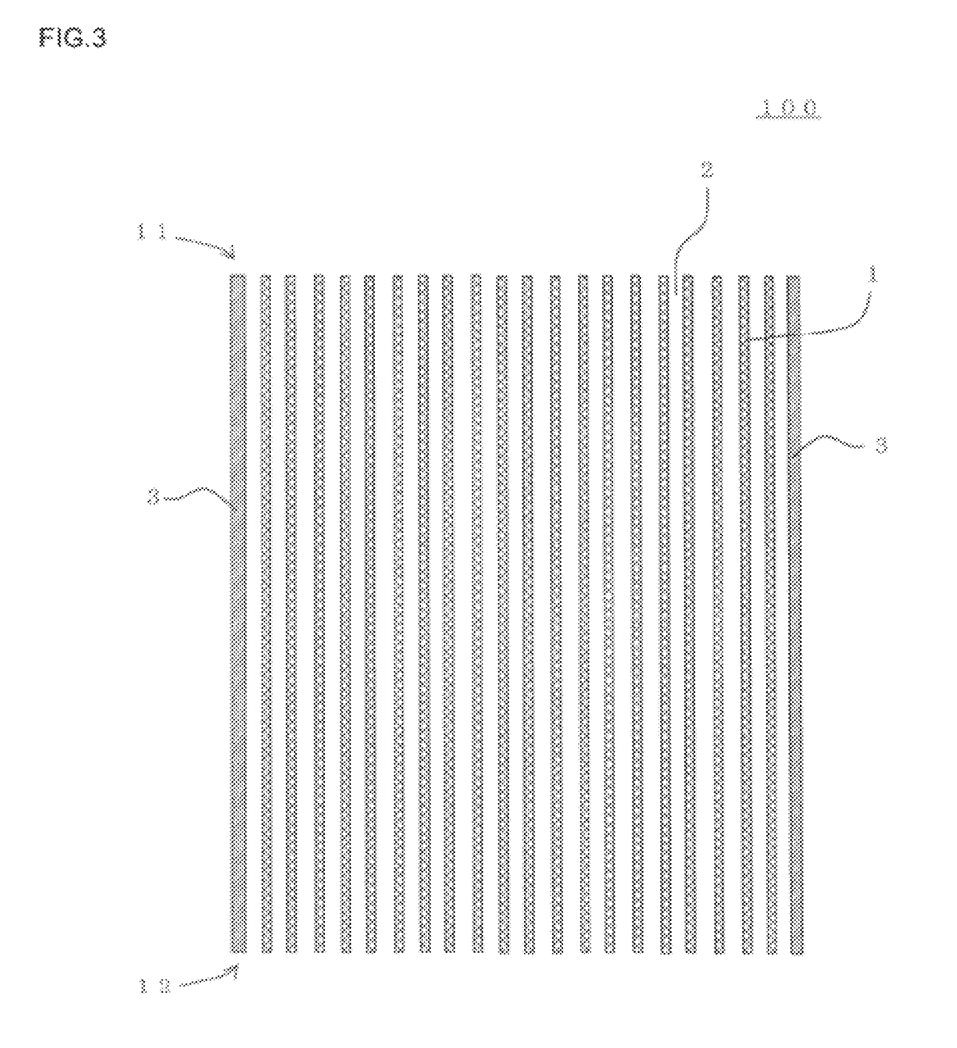
FIG. 3 is an exemplary diagram showing a section of embodiment of the honeycomb structural body of the present invention which is parallel to a cell extending direction.

(1) Honeycomb Structural Body:

As shown in FIG. 1 to FIG. 3, a honeycomb structural body 100 of the present invention includes porous partition walls 1 arranged to form a plurality of cells 2 which become through channels of a fluid. Porosities of the partition walls 1 are from 45 to 70%. A pore diameter distribution of the partition walls 1 is measured by mercury porosimetry, and the pore diameter distribution indicates a bimodal distribution. In this bimodal distribution, a pore diameter at the maximum peak value of a small pore side distribution is from 1 to 10 μm, and a pore diameter at the maximum peak value of a large pore side distribution exceeds 10 μm. A ratio between a pore volume of the small pores and a pore volume of the large pores (the pore volume of the small pores:the pore volume of the large pores) is in a range of 1:7 to 1:1 in the honeycomb structural body 100.

Here, FIG. 1 is a perspective view schematically showing an embodiment of the honeycomb structural body of the present invention. FIG. 2 is a plan view showing one end surface side of the embodiment of the honeycomb structural body of the present invention. FIG. 3 is an exemplary diagram showing a section of the embodiment of the honeycomb structural body of the present invention which is parallel to a cell extending direction. The honeycomb structural body 100 of the present embodiment is a cylindrical honeycomb structural body including porous partition walls 1 arranged to form a plurality of cells 2 extending from one end surface 11 to the other end surface 12, and an outer peripheral wall 3 positioned in the outermost periphery thereof.

The honeycomb structural body of the present embodiment is preferably used as a catalyst carrier onto which a catalyst is loaded to remove components such as nitrogen oxides (NOx) included in an exhaust gas to be purified.

As described above, the porous partition walls 1 are provided with dense pores (hereinafter referred to as "the small pores") and pores having pore diameters which are larger than the small pores (hereinafter referred to as "the large pores") at a predetermined volume ratio. On the honeycomb structural body having such a constitution, a large amount of catalyst can be loaded, while maintaining a strength of the body. That is, in the conventional honeycomb structural body, the enhancement of catalyst loading properties and the enhancement of the strength of the honeycomb structural body have an antimony relation, and it has been remarkably difficult to establish both the enhancements. Since the pore diameter distribution is the above specific bimodal distribution, it is possible to enhance the catalyst loading properties while maintaining the strength (e.g. an A-axis compressive strength) of the body.

In the honeycomb structural body of the present embodiment, the porosities of the partition walls are from 45 to 70%. According to this constitution, it is possible to satisfactorily load a large amount of catalyst onto the partition walls, while maintaining the strength of the honeycomb structural body. Furthermore, it is possible to suppress the rise of a pressure loss of the honeycomb structural body. If the porosity is, for example, smaller than 45%, the pressure loss increases sometimes. Moreover, if the porosity exceeds 70%, the strength decreases sometimes. "The porosities of the partition walls" mean the porosities measured by mercury porosimetry.

In the honeycomb structural body of the present embodiment, the porosities of the partition walls are preferably from 45 to 65%, and further preferably from 50 to 60%. According to such a constitution, it is possible to effectively suppress the rise of the pressure loss, while maintaining the strength of the honeycomb structural body.

In the honeycomb structural body of the present embodiment, the pore diameter distribution of the partition walls is measured by the mercury porosimetry (hereinafter referred to simply as "the pore diameter distribution of the partition walls"), and the pore diameter distribution indicates a bimodal distribution. That is, the pore diameter distribution of the partition walls does not have any distribution curve with a single peak but has a distribution curve with two peaks (in other words, a two-peaks distribution).

In the above bimodal distribution, the pore diameter at the maximum peak value of the small pore side distribution is from 1 to 10 μm, and the pore diameter at the maximum peak value of the large pore side distribution exceeds 10 μm. Moreover, the ratio between the pore volume of the small pores and the pore volume of the large pores (the pore volume of the small pores:the pore volume of the large pores) is in a range of 1:7 to 1:1. According to such a constitution, a larger amount of catalyst can be loaded on the inside of each of the large pores. Further in the partition walls in which the only large pores are formed, the strength of the honeycomb structural body lowers sometimes. However, when the ratio between the pore volume of the small pores and the pore volume of the large pores is set to a range of 1:7 to 1:1, the lowering of the strength of the honeycomb structural body can effectively be suppressed.

The pore diameter distribution in the present invention is a pore diameter distribution when the pore diameters of the partition walls measured by the mercury porosimetry are indicated by common logarithm. For example, the distribution can be indicated by a graph in which the abscissa indicates the pore diameter (the common logarithm: μm) and the ordinate indicates a log differential pore volume (cc/g). An average pore diameter and pore diameter distribution of the partition walls can be measured with a mercury porosimeter (e.g. trade name: Autopore 9500 manufactured by Micromeritics Co.).

"The small pore side distribution" means a smaller pore diameter side distribution in the pore diameter distribution indicating the bimodal distribution (i.e. the smaller pore diameter side distribution in the two-peaks distribution). "The large pore side distribution" means a larger pore diameter side distribution in the pore diameter distribution indicating the bimodal distribution (i.e. the larger pore diameter side distribution in the two-peaks distribution).

"The maximum peak value of the small pore side distribution" means a value of a distribution vertex indicating the maximum value of the pore volume of the smaller pore diameter distribution in the pore diameter distribution indicating the bimodal distribution. "The maximum peak value of the large pore side distribution" means a value of a distribution vertex indicating the maximum value of the pore volume of the larger pore diameter distribution in the pore diameter distribution indicating the bimodal distribution.

"The pore diameter at the maximum peak value" means the value of the pore diameter at the distribution vertex indicating the maximum value of the pore volume. That is, the pore diameter means the value of the pore diameter (in other words, the abscissa) at the distribution vertex at which the log differential pore volume (in other words, the ordinate) is maximized, in the graph indicating the pore diameter distribution in which the abscissa indicates the pore diameter and the ordinate indicates the log differential pore volume. Therefore, "the pore diameter at the maximum peak value of the small pore side distribution" is the value of the pore diameter at which the pore volume has the maximum value of the distribution with the smaller pore diameter in the pore diameter distribution indicating the bimodal distribution. On the other hand, "the pore diameter at the maximum peak value of the large pore side distribution" is the value of the pore diameter at which the pore volume has the maximum value of the larger pore diameter distribution in the pore diameter distribution indicating the bimodal distribution.

"The small pores" are pores constituting the distribution with the smaller pore diameter in the pore diameter distribution indicating the bimodal distribution. Moreover, "the large pores" are pores constituting the distribution with the larger pore diameter in the pore diameter distribution indicating the bimodal distribution.

In the honeycomb structural body of the present embodiment, the pore diameter at the maximum peak value of the above small pore side distribution is from 1 to 10 μm. When the pore diameter distribution indicates the bimodal distribution but the pore diameter at the maximum peak value of the small pore side distribution exceeds 10 μm, both the maximum peak values of two distributions of the bimodal distribution exceed 10 μm, and the strength of the honeycomb structural body lowers. Moreover, when the pore diameter at the maximum peak value of the small pore side distribution is smaller than 1 μm, catalyst loading properties unfavorably deteriorate.

Moreover, in the honeycomb structural body of the present embodiment, the pore diameter at the maximum peak value of the above large pore side distribution exceeds 10 μm. When the pore diameter at the maximum peak value of the large pore side distribution is 10 μm or smaller, both the maximum peak values of two distributions of the bimodal distribution become 10 μm or smaller, and the catalyst cannot sufficiently be loaded into the pores. There is not any special restriction on an upper limit of the pore diameter at the maximum peak value of the large pore side distribution. However, when the pore diameter at the maximum peak value of the large pore side distribution becomes excessively large, the strength of the honeycomb structural body lowers sometimes. Therefore, the upper limit of the pore diameter at the maximum peak value of the large pore side distribution is preferably 200 μm or smaller, further preferably 180 μm or smaller, and especially preferably 160 μm or smaller.

"The ratio between the pore volume of the small pores and the pore volume of the large pores" is a numeric relation between the pore volume of the small pores and the pore volume of the large pores, represented by "the pore volume of the small pores:the pore volume of the large pores". The pore volume of the small pores is a pore volume obtained from an integrated value of the pore volumes of the pores having pore diameters of 10 μm or smaller in the pore volumes obtained with the mercury porosimeter. On the other hand, the pore volume of the large pores is a pore volume obtained from an integrated value of the pore volumes of the pores having pore diameters exceeding 10 μm in the pore volumes obtained with the mercury porosimeter.

"The ratio between the pore volume of the small pores and the pore volume of the large pores is in a range of 1:7 to 1:1" means that the ratio of the pore volume of the small pores with respect to the pore volume of the large pores is in a range of 1/7 to 1.

When the ratio of the pore volume of the small pores becomes small beyond the above range in the ratio between the pore volume of the small pores and the pore volume of the large pores (i.e. the ratio of the pore volume of the small pores becomes smaller than 1:7), more large pores are formed in the partition walls, and a large amount of catalyst can be loaded, but the strength of the honeycomb structural body lowers. On the other hand, when the ratio of the pore volume of the small pores becomes large beyond the above range (i.e. the ratio of the pore volume of the small pores becomes larger than 1:1), many large pores are not formed in the partition walls, and the catalyst loading properties deteriorate.

The ratio between the pore volume of the small pores and the pore volume of the large pores is from 1:7 to 1:1, preferably from 1:6 to 1:2, and further preferably from 1:5 to 1:3. According to such a constitution, there can be formed the honeycomb structural body which is excellent in catalyst loading properties while satisfactorily suppressing the lowering of the strength of the honeycomb structural body.

There is not any special restriction on a thickness of the partition wall in the honeycomb structural body of the present embodiment, but the thickness is preferably from 0.060 to 0.288 mm, further preferably from 0.108 to 0.240 mm, and especially preferably from 0.132 to 0.192 mm. According to such a constitution, there can be formed the honeycomb structural body having a high strength and having a decreased pressure loss.

"The thickness of the partition wall" means the thickness of a wall (the partition wall) disposed to form two adjacent cells in a section of the honeycomb structural body cut vertically in a cell extending direction. Examples of a measuring method of "the thickness of the partition wall" include a measuring method by, for example, an image analysis device (trade name "NEXIV, VMR-1515" manufactured by Nikon Corporation).

In the honeycomb structural body of the present embodiment, the partition walls are made of a ceramic material. Even when the partition walls made of the ceramic material are provided with the large pores, a high strength is realized, and the partition walls are excellent in a heat resistance and the like. It is to be noted that the partition walls excellent in strength and heat resistance are further preferably made of a material containing at least one ceramic component selected from the group consisting of cordierite, silicon carbide, aluminum titanate, mullite, alumina, spinel, a silicon carbide-cordierite based composite material, lithium aluminum silicate, and aluminum titanate.

There is not any special restriction on a shape of the honeycomb structural body of the present embodiment, but a cylindrical shape, a tubular shape with an elliptic end surface, a polygonal post-like shape with a "square, rectangular, triangular, pentangular, hexagonal or octagonal" end surface, or the like is preferable. FIG. 1 to FIG. 3 show an example where the honeycomb structural body 100 has a cylindrical shape. In the present description, the cylindrical shape, the tubular shape with the elliptic end surface and the polygonal post shape will be referred to as "tubular" sometimes. Moreover, the honeycomb structural body 100 shown in FIG. 1 to FIG. 3 has the outer peripheral wall 3, but may not have the outer peripheral wall 3. When the honeycomb structural body 100 is prepared and a formed honeycomb body is formed by extrusion, the outer peripheral wall 3 may be formed together with the partition walls 1. Moreover, during the extrusion forming, the outer peripheral wall 3 does not have to be formed. For example, the outer peripheral wall 3 can be formed by applying the ceramic material to the outer periphery of the honeycomb structural body 100.

There is not any special restriction on a cell shape (the cell shape in a section of the honeycomb structural body which is orthogonal to a center axis direction thereof (the cell extending direction)), and examples of the cell shape include a triangular shape, a quadrangular shape, a hexagonal shape, an octagonal shape, a round shape and a combination of these shapes. In the quadrangular shape, a square shape or a rectangular shape is preferable.

In the honeycomb structural body of the present embodiment, a cell density is preferably from 15 to 140 cells/cm$^2$, further preferably from 31 to 116 cells/cm$^2$, and especially preferably from 46 to 93 cells/cm$^2$. According to such a constitution, it is possible to suppress the rise of the pressure loss while maintaining the strength of the honeycomb structural body.

When the honeycomb structural body of the present embodiment is manufactured, a honeycomb structural body manufacturing raw material including an added pore former having a comparatively large average particle diameter is preferably used to form large pores in the partition walls. Examples of the above pore former include a pore former having an average particle diameter of 100 µm or larger.

An amount of the pore former is preferably about 10 parts by mass with respect to 100 parts by mass of the honeycomb structural body manufacturing raw material. For example, a kneaded clay made of the above raw material (i.e. the raw material including the added pore former having a large average particle diameter) is extruded to obtain the formed honeycomb body, and the obtained formed honeycomb body is fired, whereby the large pores are formed in the partition walls by the above pore former. As the above pore former, for example, starch, resin balloon, water absorbing resin, silica gel or the like can be used.

The honeycomb structural body of the present embodiment is formed as a honeycomb catalyst body by loading the catalyst onto the insides of the pores of the partition walls, and utilized to purify an exhaust gas discharged from an internal combustion engine or the like. That is, the honeycomb structural body of the present embodiment is preferably used as a catalyst carrier for loading the catalyst thereon. Since the large pores are formed in the partition walls of the honeycomb structural body, a large amount of catalyst can be loaded into the large pores of the partition walls. Moreover, since small pores are formed at a predetermined ratio in the partition walls of the honeycomb structural body, it is possible to effectively suppress the lowering of the strength.

There is not any special restriction on a type of the catalyst, but examples of the catalyst include a catalyst containing at least one selected from the group consisting of a zeolite subjected to an ion exchange treatment with metal ions, vanadium, titania, tungsten oxide, silver and alumina. Examples of the metal ions of the above ion exchange treatment include copper (Cu) and iron (Fe).

There is not any special restriction on the amount of the catalyst loaded onto the partition walls. The amount of the catalyst to be loaded is, for example, preferably from 100 to 300 g/L, and further preferably from 150 to 250 g/L. The above "loading amount (g/L)" is a mass (g) of the catalyst to be loaded per 1 liter (L) of a volume of the honeycomb structural body which is the catalyst carrier.

The catalyst carrier with the catalyst loaded into the pores is used as an exhaust gas treatment device in a state where the body is inserted into and held by a metal can member via a holding member (a mat). The catalyst carrier (i.e. the exhaust gas treatment device) received in the metal can member is mounted on an exhaust system (an exhaust path) for a car or the like.

(2) Manufacturing Method of Honeycomb Structural Body:

Next, an example of a manufacturing method of the honeycomb structural body of the present embodiment (the manufacturing method of the honeycomb structural body) will be described. The manufacturing method of the honeycomb structural body of the present embodiment includes a kneaded clay preparing step of mixing and kneading forming raw materials containing a ceramic raw material to obtain a kneaded clay; a forming step of forming the obtained kneaded clay into a honeycomb shape to obtain a formed honeycomb body; and a firing step of drying and firing the obtained formed honeycomb body to obtain a honeycomb structural body including porous partition walls arranged to form a plurality of cells which become through channels of a fluid, and the kneaded clay preparing step adds a pore former having particle diameters of 100 µm or more to the ceramic raw material to prepare the kneaded clay.

According to such a manufacturing method, the pore diameter distribution of the partition walls is measured by the mercury porosimetry, and the pore diameter distribution indicates the bimodal distribution. In this bimodal distribution, the pore diameter at the maximum peak value of the small pore side distribution is from 1 to 10 µm, the pore diameter at the maximum peak value of the large pore side distribution exceeds 10 µm, and the ratio between the pore volume of the small pores and the pore volume of the large pores is in a range of 1:7 to 1:1. This honeycomb structural body can satisfactorily be obtained.

By the above pore former, large pores in the pore diameter distribution of the bimodal distribution are formed. On the other hand, each of small pores in the pore diameter distribution of the bimodal distribution are formed by a space between raw material particles. Therefore, the amount of the large pores (i.e. the pore volume of the large pores) can be regulated in accordance with the amount of the pore former to be added. On the other hand, the amount of the small pores (i.e. the pore volume of the small pores) can be regulated in accordance with the pore diameters of the raw material particles. That is, in the manufacturing method of the honeycomb structural body of the present embodiment, when the amount of the pore former and the pore diameters of the raw material particles are regulated, it is possible to manufacture the honeycomb structural body in which the pore diameter at the maximum peak value of the small pore side distribution is from 1 to 10 µm, the pore diameter at the maximum peak value of the large pore side distribution exceeds 10 µm and the ratio between the pore volume of the small pores and the pore volume of the large pores is in a range of 1:7 to 1:1.

Hereinafter, each manufacturing step of the manufacturing method of the honeycomb structural body of the present embodiment will be described in more detail.

(2-1) Kneaded Clay Preparing Step:

First, when the honeycomb structural body of the present embodiment is manufactured, forming raw materials containing a ceramic raw material are mixed and kneaded to obtain a kneaded clay (the kneaded clay preparing step).

The ceramic raw material contained in the forming raw material is preferably at least one type selected from the group consisting of a cordierite forming raw material, cordierite, silicon carbide, a silicon-silicon carbide based composite material, mullite, alumina, aluminum titanate, silicon nitride, a silicon carbide-cordierite based composite material, lithium aluminum silicate, and aluminum titanate. The cordierite forming raw material is a ceramic raw material blended to obtain a chemical composition in a range of 42 to 56 mass % of silica, 30 to 45 mass % of alumina and 12 to 16 mass % of magnesia, and the ceramic raw material is fired to become cordierite.

As the pore former, the water absorbing resin or the like can preferably be used.

An amount of the pore former to be added with respect to 100 parts by mass of a main raw material (e.g. the ceramic raw material contained in the forming raw material) is preferably from 1 to 10 parts by mass, further preferably 1 to 8 parts by mass, and especially preferably from 1 to 6 parts by mass. If the amount of the pore former to be added is smaller than 1 part by mass, the ratio of the large pores formed in the partition walls decreases, and the amount of the catalyst which can be loaded on the obtained honeycomb structural body decreases sometimes. On the other hand, if the amount of the pore former to be added exceeds 10 parts by mass, the ratio of the large pores becomes excessively large, and the strength of the obtained honeycomb structural body lowers sometimes.

The average particle diameter of the pore former is preferably from 50 to 200 µm, further preferably from 80 to 170 µm, and especially preferably from 100 to 150 µm. If the average particle diameter of the pore former is excessively large, the pore diameter at the maximum peak value of the large pore side distribution in the pore diameter distribution becomes excessively large, and the strength lowers sometimes. On the other hand, if the average particle diameter of the pore former is excessively small, the pore diameter at the maximum peak value of the large pore side distribution in the pore diameter distribution becomes 10 µm or smaller.

Moreover, the forming raw material is preferably obtained by further mixing the above ceramic raw material and the pore former with a dispersion medium, an organic binder, an inorganic binder, a surfactant and the like. There is not any special restriction on a composition ratio of the respective raw materials, and the composition ratio is preferably set in accordance with a structure, material and the like of the honeycomb structural body to be prepared.

As the dispersion medium, water can be used. An amount of the dispersion medium to be added is preferably from 30 to 150 parts by mass with respect to 100 parts by mass of the ceramic raw material.

As the organic binder, there is preferably used methylcellulose, hydroxypropyl methylcellulose, hydroxypropyl ethyl cellulose, hydroxyethyl cellulose, carboxymethyl cellulose, polyvinyl alcohol or a combination of these binders. An amount of the organic binder to be added is preferably from 1 to 10 parts by mass with respect to 100 parts by mass of the ceramic raw material.

As the surfactant, ethylene glycol, dextrin, fatty acid soap (e.g. lauric potash soap), polyalcohol or the like can be used. These surfactants may be used alone or as a combination of two or more of them. An amount of the surfactant to be added is preferably from 0.1 to 5 parts by mass with respect to 100 parts by mass of the ceramic raw material.

There is not any special restriction on a method of kneading the forming raw material to form the kneaded clay, and examples of the method include methods using a kneader, a vacuum clay kneader and the like.

(2-2) Forming Step:

Next, the obtained kneaded clay is formed into a honeycomb shape to obtain the formed honeycomb body (a forming step). There is not any special restriction on a method of forming the formed honeycomb body by use of the kneaded clay, and a known forming method such as extrusion forming or injection forming can be used. Examples include a preferable example in which the material is extruded by using a die having a desirable cell shape, partition wall thickness or cell density to form the formed honeycomb body. As a material of the die, a super hard alloy which is not easily worn is preferable.

There is not any special restriction on a shape of the formed honeycomb body, and a cylindrical shape, a tubular shape with an elliptic end surface, a polygonal post-like shape with a "square, rectangular, triangular, pentangular, hexagonal or octagonal" end surface, or the like is preferable.

(2-3) Firing Step:

Next, the obtained formed honeycomb body is dried and fired to obtain the honeycomb structural body including the porous partition walls arranged to form a plurality of cells which become the through channels of the fluid (a firing step). In consequence, it is possible to satisfactorily manufacture the honeycomb structural body in which large air pores are formed in the partition walls as compared with a conventional honeycomb structural body.

There is not any special restriction on a drying method, and examples of the method include hot air drying, microwave drying, dielectric drying, reduced-pressure drying, vacuum drying and freeze drying. Above all, the dielectric drying, the microwave drying or the hot air drying are preferably performed alone or as a combination thereof.

Before firing (finally firing) the formed honeycomb body, this formed honeycomb body is preferably calcinated.

The calcinating is performed for degreasing, and there is not any special restriction on a calcinating method as long as at least part of organic matters (the organic binder, the surfactant, the pore former and the like) in the formed honeycomb body can be removed. In general, a burning temperature of the organic binder is from about 100 to 300° C., and a burning temperature of the pore former is from about 200 to 800° C. Therefore, as preferable calcinating conditions, heating is preferably performed at about 200 to 1000° C. in an oxidizing atmosphere for about 10 to 100 hours.

The firing (final firing) of the formed honeycomb body is performed by sintering the forming raw material constituting the calcinated formed body to densify the material, thereby acquiring a predetermined strength. The firing conditions (a temperature, time and atmosphere) vary in accordance with the type of the forming raw material, and hence appropriate conditions may be selected in accordance with the type of the forming raw material. When, for example, the cordierite forming raw material is used, the firing temperature is preferably from 1350 to 1440° C. Moreover, the firing time is preferably from 3 to 10 hours as a highest temperature keeping time. There is not any special restriction on a device which performs the calcinating and the final firing, and an electric furnace, a gas furnace or the like can be used.

EXAMPLES

Hereinafter, the honeycomb structural body of the present invention will further specifically be described with respect to examples, but the present invention is not limited to these examples.

Example 1

In Example 1, a cordierite forming raw material was used as a ceramic raw material, a water absorbing resin was added as a pore former to this cordierite forming raw material to prepare a kneaded clay, the obtained kneaded clay was extruded to form a formed honeycomb body, and the obtained formed honeycomb body was fired to prepare a honeycomb structural body.

Specifically, alumina, aluminum hydroxide, kaolin, talc and silica were used as the cordierite forming raw material. To 100 parts by mass of this cordierite forming raw material, 10 parts by mass of the water absorbing resin having an average particle diameter of 120 μm was added as the pore former.

Furthermore, 5 parts by mass of hydroxypropyl methylcellulose was added as the binder, 0.5 part by mass of lauric potash soap was added as the surfactant, and 50 parts by mass of water was added to obtain the forming raw material. The obtained forming raw material was mixed and kneaded by use of a kneader, and then a cylinder-shaped kneaded clay was prepared by using a vacuum clay kneader.

Next, the kneaded clay was extruded to obtain the formed honeycomb body. A cell shape was a square shape which was orthogonal to a cell extending direction. The obtained formed honeycomb body was dried with microwaves, and further dried by hot air drying. Both end surfaces of the body were cut into a predetermined dimension to obtain a dried honeycomb body.

Next, the dried honeycomb body was heated at 1420° C. for 4 hours, to perform firing, thereby obtaining a honeycomb structural body.

The obtained honeycomb structural body had a columnar shape with an end surface diameter of 70 mm, and a length (an axial direction length) of 50 mm in the cell extending direction. Moreover, the honeycomb structural body had a partition wall thickness of 0.140 mm, a cell density of 62 cells/cm$^2$, and a porosity of 65.3%. The porosity was a value measured by mercury porosimetry using a device with trade name: Autopore 9500 manufactured by Micromeritics Co. "The partition wall thickness (mm)", "the cell density (cells/cm$^2$)" and "the porosity (%)" of the honeycomb structural body of Example 1 are shown in Table 1.

TABLE 1

|  | Partition wall thickness (mm) | Cell density (cells/cm$^2$) | Porosity (%) | Small pore side peak pore diameter (μm) | Large pore side peak pore diameter (μm) | Pore volume ratio (—) | Zeolite content (g/L) | A-axis compressive strength (MPa) | Pressure loss ratio (—) |
|---|---|---|---|---|---|---|---|---|---|
| Comparative Example 1 | 0.114 | 62 | 36.7 | 3.1 | — | — | 250 | 8.5 | 1.00 |
| Comparative Example 2 | 0.140 | 62 | 64.4 | 26.4 | — | — | 250 | 0.3 | 0.85 |
| Comparative Example 3 | 0.140 | 62 | 46 | 12.1 | — | — | 250 | 4 | 0.87 |
| Comparative Example 4 | 0.140 | 62 | 47.5 | 13 | — | — | 250 | 3 | 0.88 |
| Comparative Example 5 | 0.140 | 62 | 50.5 | 15.3 | — | — | 250 | 2.8 | 0.85 |
| Comparative Example 6 | 0.140 | 62 | 55 | 17.5 | — | — | 250 | 1.4 | 0.84 |
| Comparative Example 7 | 0.140 | 62 | 60 | 18.9 | — | — | 250 | 0.5 | 0.83 |
| Comparative Example 8 | 0.140 | 62 | 63 | 20.1 | — | — | 250 | 0.4 | 0.81 |
| Comparative Example 9 | 0.140 | 62 | 70 | 22.3 | — | — | 250 | 0.1 | 0.78 |
| Example 1 | 0.140 | 62 | 65.3 | 4.8 | 42.6 | 3.2 | 250 | 0.3 | 0.79 |
| Example 2 | 0.140 | 62 | 48.8 | 3.6 | 33.7 | 1.4 | 250 | 4.8 | 0.85 |
| Example 3 | 0.140 | 62 | 49 | 3.6 | 85.3 | 1.3 | 250 | 3.3 | 0.86 |
| Example 4 | 0.140 | 62 | 60 | 4.2 | 42.1 | 2.5 | 250 | 1.3 | 0.82 |
| Example 5 | 0.140 | 62 | 65 | 4.9 | 43 | 3.4 | 250 | 0.8 | 0.8 |
| Example 6 | 0.140 | 62 | 70 | 5.3 | 45.2 | 4.3 | 250 | 0.5 | 0.78 |

Figure 4:
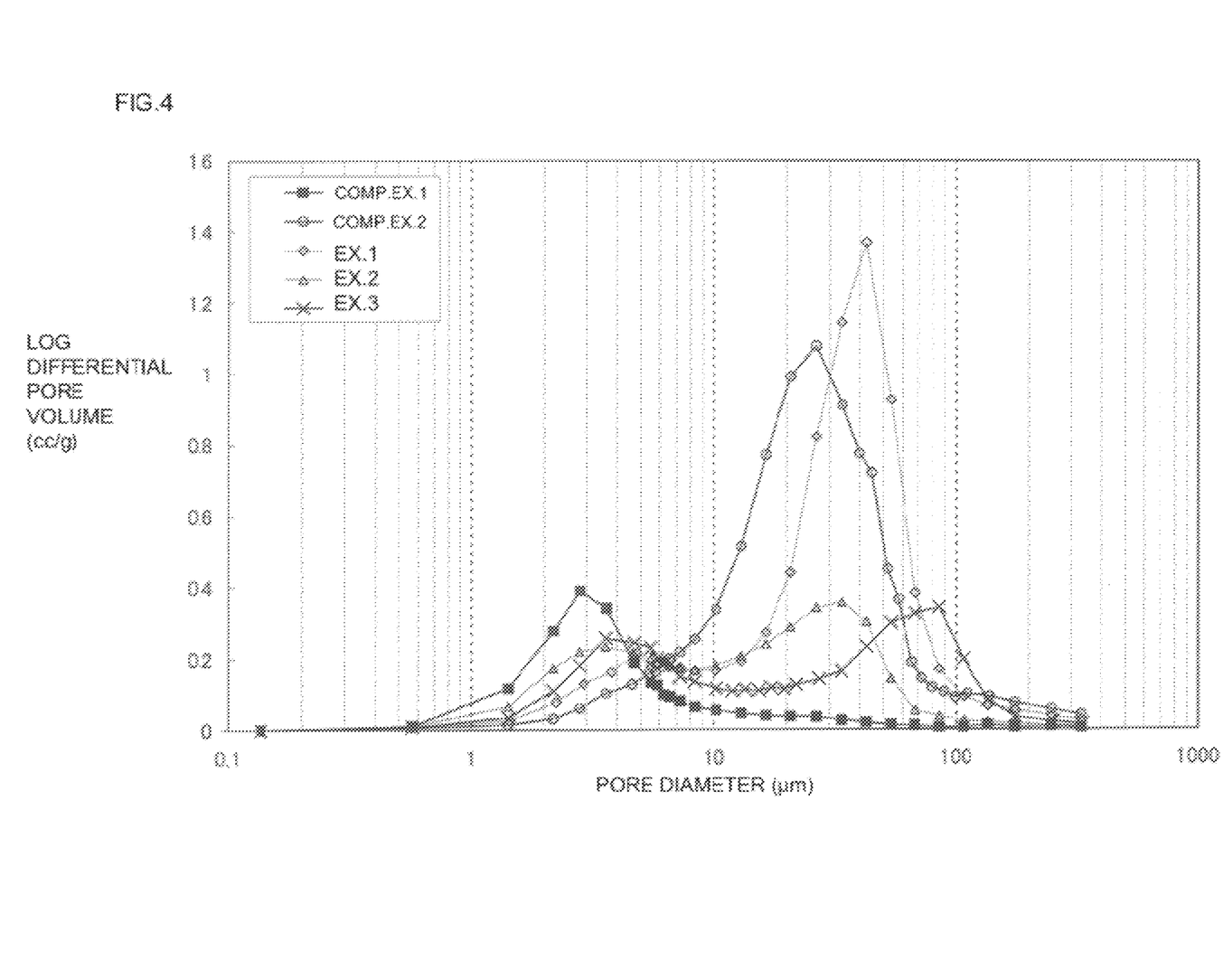
FIG. 4 is a graph showing a pore diameter distribution of honeycomb structural bodies of Examples 1 to 3 and Comparative Examples 1 and 2.

As to the obtained honeycomb structural body, a pore diameter distribution of pores formed in partition walls was measured. The pore diameter distribution was measured with the device with the trade name: Autopore 9500 manufactured by Micromeritics Co. FIG. 4 is a graph showing the pore diameter distributions of the honeycomb structural bodies of Examples 1 to 3 and Comparative Examples 1 and 2. In FIG. 4, the abscissa indicates a pore diameter (a common logarithm: μm), and the ordinate indicates a log differential pore volume (cc/g).

Moreover, "a small pore side peak pore diameter (μm)" and "a large pore side peak pore diameter (μm)" were obtained from a graph indicating this pore diameter distribution. The results are shown in Table 1. It is to be noted that "the small pore side peak pore diameter (μm)" is a value of a pore diameter at a maximum peak value (i.e. a vertex of the distribution) of a smaller pore diameter side distribution in the pore diameter distribution (two distributions of a bimodal distribution in Example 1). Moreover, "the large pore side peak pore diameter (μm)" is a value of a pore diameter at a maximum peak value (i.e. the vertex of the distribution) of a larger pore diameter side distribution in the pore diameter distribution (two peaks of the bimodal distribution in Example 1). Moreover, "a pore volume ratio (-)" is shown in Table 1. "The pore volume ratio (-)" is a value calculated by a value of a ratio between a pore volume of small pores and a pore volume of large pores (specifically, the value of "the pore volume of the large pores/the pore volume of the small pores".

Moreover, a zeolite subjected to an ion exchange treatment with Cu ions was loaded as a catalyst onto the obtained honeycomb structural body. Table 1 shows an amount of the zeolite loaded onto the honeycomb structural body (indicated as "the zeolite content (g/L)" in Table 1). The zeolite as the catalyst was loaded into the pores of the partition walls of the honeycomb structural body by a pore filling process.

Moreover, as to the obtained honeycomb structural body, "an A-axis compressive strength (MPa)" and "a pressure loss ratio (-)" were evaluated by the following method. The results are shown in Table 1.

[A-Axis Compressive Strength (MPa)]

The A-axis compressive strength is a compressive strength (MPa) prescribed in JASO standard M505-87 which is a car standard issued by the Society of Automotive Engineers of Japan. In the present example, a compressive load was applied to the honeycomb structural body in a center axis direction thereof, and a pressure (the A-axis compressive strength) was measured when the honeycomb structural body was broken.

[Pressure Loss (-)]

Air was circulated through the honeycomb structural body loading 250 g/L of the zeolite on room temperature conditions at a flow velocity of 0.5 m³/minute, and a pressure difference (a differential pressure) between an inlet side end surface and an outlet side end surface of the honeycomb structural body was measured. This pressure difference was measured as a pressure loss of the honeycomb structural body (the pressure loss), and a value of a ratio of the pressure loss of each example or each comparative example with respect to the pressure loss of Comparative Example 1 (i.e. the value of the ratio of the pressure loss of each example or comparative example in a case where the pressure loss of Comparative Example 1 was set to 1.00) was obtained as "the pressure loss ratio (-)".

Examples 2 to 6

In Examples 2 to 6, particle diameters of raw materials were regulated so as to obtain properties shown in Table 1, thereby preparing honeycomb structural bodies each having "a partition wall thickness", "a porosity", "a small pore side peak pore diameter (μm)", "a large pore side peak pore diameter (μm)" and "a pore volume ratio (-)" as shown in Table 1.

Comparative Examples 1 to 9

In Comparative Examples 1 to 9, when a kneaded clay was prepared, any water absorbing resin was not added to prepare the kneaded clay, thereby preparing honeycomb structural bodies each having "a partition wall thickness", "a porosity", "a small pore side peak pore diameter (μm)", "a large pore side peak pore diameter (μm)" and "a pore volume ratio (-)" as shown in Table 1.

As to the obtained honeycomb structural bodies of Examples 2 to 6 and Comparative Examples 1 to 9, "the A-axis compressive strength (MPa)" and "the pressure loss ratio (-)" were evaluated in the same manner as in Example 1. The results are shown in Table 1. Moreover, pore diameter distributions of the honeycomb structural bodies of Examples 2 and 3 and Comparative Examples 1 and 2 are shown in FIG. 4.

Figure 5:
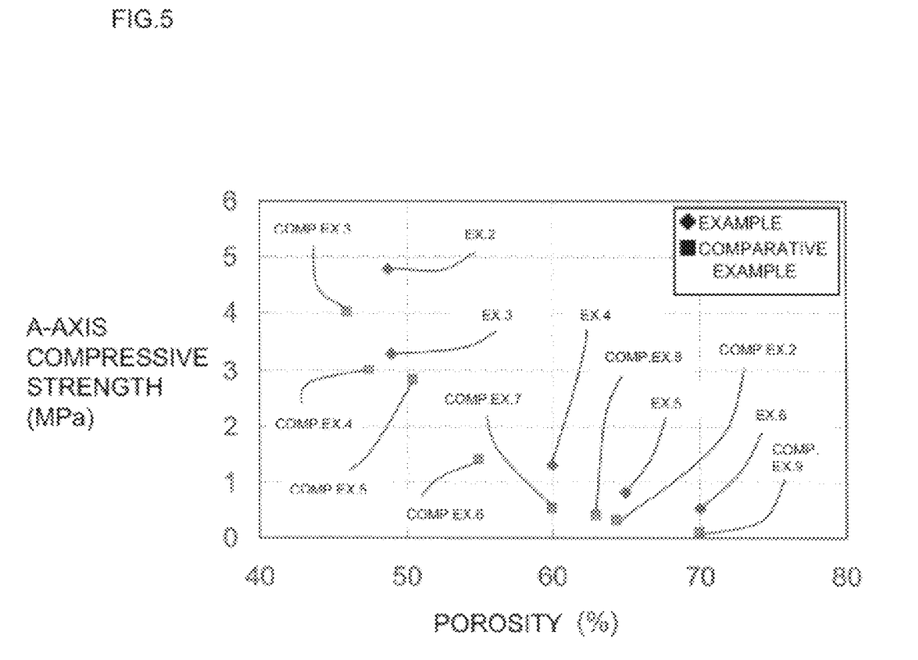
FIG. 5 is a graph showing a relation between a porosity (%) and an A-axis compressive strength (MPa) in the honeycomb structural bodies of the respective examples and comparative examples.

Moreover, FIG. 5 shows a relation between the porosity (%) and the A-axis compressive strength (MPa) in the honeycomb structural bodies of the respective examples and comparative examples. FIG. 5 is a graph showing the relation between the porosity (%) and the A-axis compressive strength (MPa) in the honeycomb structural bodies of the respective examples and comparative examples. In FIG. 5, the abscissa indicates the porosity (%), and the ordinate indicates the A-axis compressive strength (MPa).

Figure 6A:
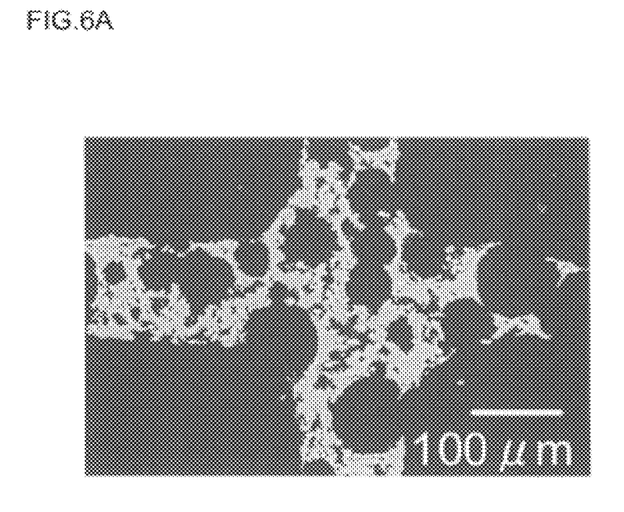
FIG. 6A is a photomicrograph of an enlarged end surface of the honeycomb structural body of Example 1.
Figure 6B:
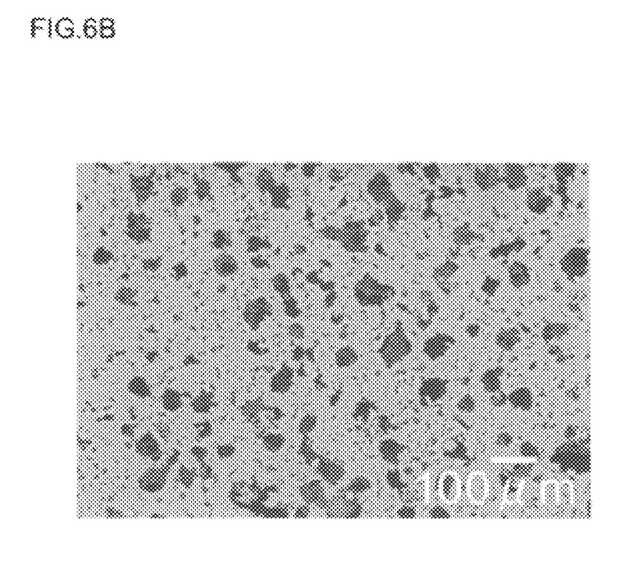
FIG. 6B is a photomicrograph of an enlarged surface of a partition wall in the honeycomb structural body of Example 1.
Figure 7A:
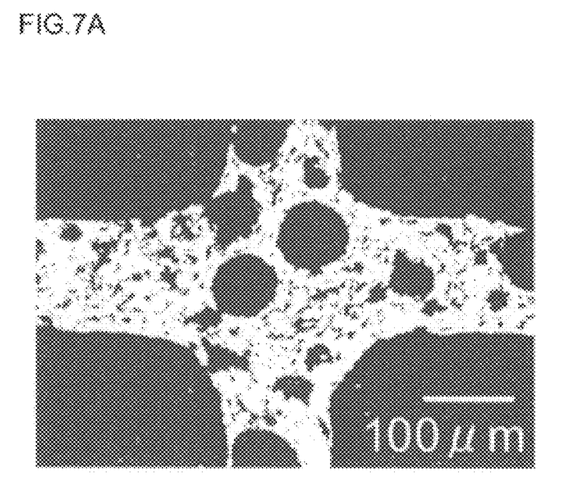
FIG. 7A is a photomicrograph of an enlarged end surface of the honeycomb structural body of Example 2.
Figure 7B:
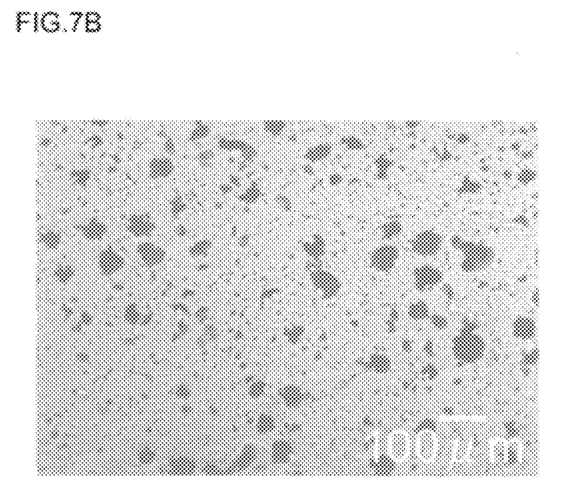
FIG. 7B is a photomicrograph of an enlarged surface of a partition wall in the honeycomb structural body of Example 2.
Figure 8A:
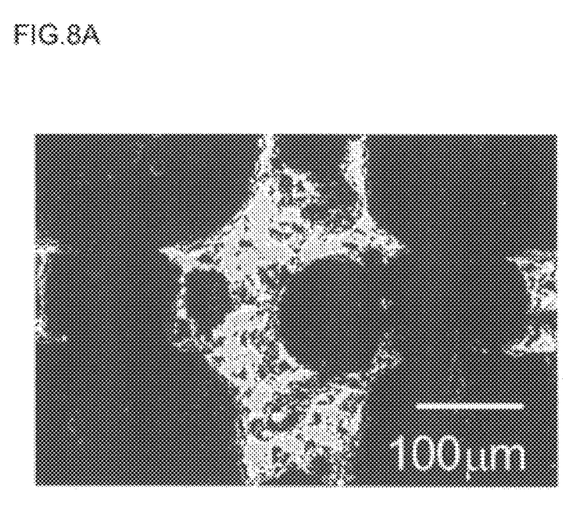
FIG. 8A is a photomicrograph of the enlarged end surface of the honeycomb structural body of Example 3.
Figure 8B:
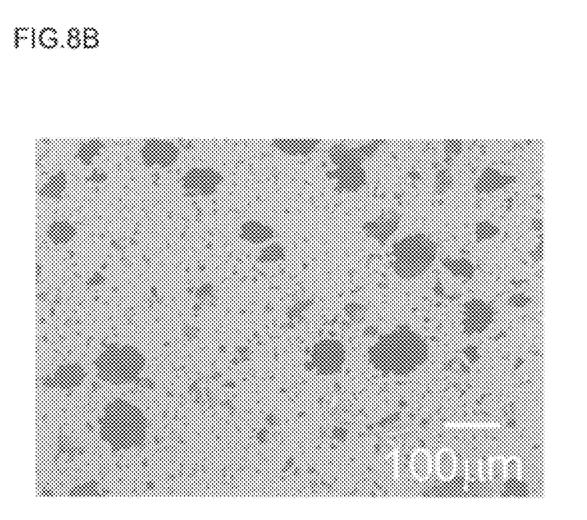
FIG. 8B is a photomicrograph of an enlarged surface of a partition wall in the honeycomb structural body of Example 3.
Figure 9A:
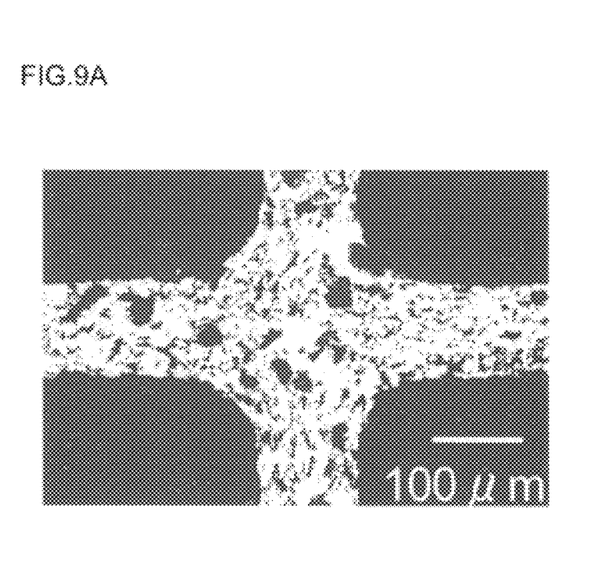
FIG. 9A is a photomicrograph of an enlarged end surface of the honeycomb structural body of Comparative Example 1.
Figure 9B:
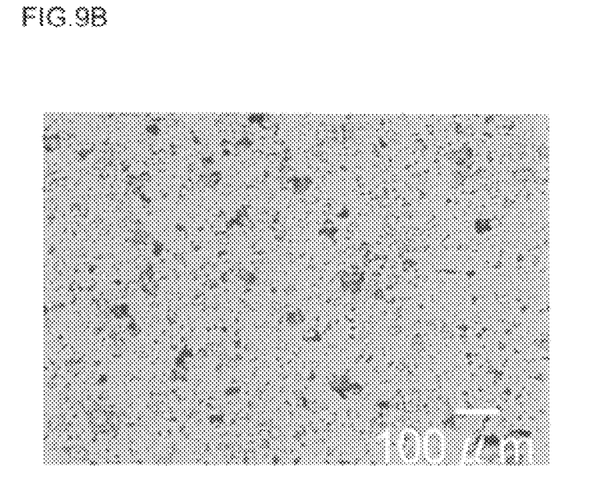
FIG. 9B is a photomicrograph of an enlarged surface of a partition wall in the honeycomb structural body of Comparative Example 1.
Figure 10A:
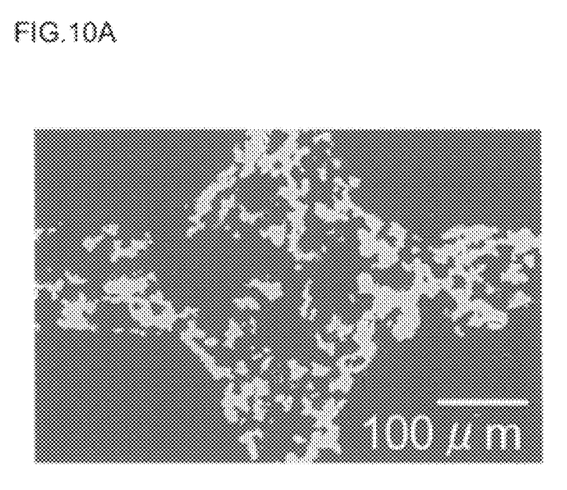
FIG. 10A is a photomicrograph of an enlarged end surface of the honeycomb structural body of Comparative Example 2.
Figure 10B:
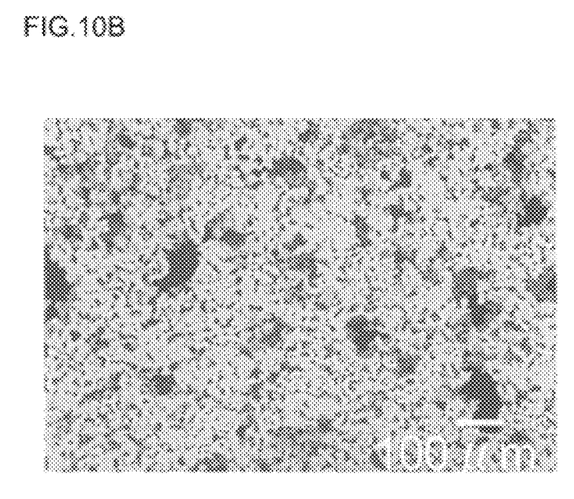
FIG. 10B is a photomicrograph of an enlarged surface of a partition wall in the honeycomb structural body of Comparative Example 2.

Furthermore, as to the honeycomb structural bodies of Examples 1 to 3 and Comparative Examples 1 and 2, a section of each honeycomb structural body cut along a cell extending direction and the surface of each partition wall were photographed with a scanning electron microscope (trade name: S-3700N manufactured by Hitachi High Technical Co.). FIG. 6A is a photomicrograph of an enlarged end surface of the honeycomb structural body of Example 1, and FIG. 6B is a photomicrograph of an enlarged surface of a partition wall in the honeycomb structural body of Example 1. FIG. 7A is a photomicrograph of an enlarged end surface of the honeycomb structural body of Example 2, and FIG. 7B is a photomicrograph of an enlarged surface of a partition wall in the honeycomb structural body of Example 2. FIG. 8A is a photomicrograph of the enlarged end surface of the honeycomb structural body of Example 3, and FIG. 8B is a photomicrograph of an enlarged surface of a partition wall in the honeycomb structural body of Example 3. FIG. 9A is a photomicrograph of an enlarged end surface of the honeycomb structural body of Comparative Example 1, and FIG. 9B is a photomicrograph of an enlarged surface of a partition wall in the honeycomb structural body of Comparative Example 1. FIG. 10A is a photomicrograph of an enlarged end surface of the honeycomb structural body of Comparative Example 2, and FIG. 10B is a photomicrograph of an enlarged surface of a partition wall in the honeycomb structural body of Comparative Example 2.

In FIG. 6A, FIG. 7A, FIG. 8A, FIG. 9A and FIG. 10A, an about quadrant (¼) of each cell partitioned by the partition walls is reflected in four portions of the upper right, lower right, upper left and lower left of an image (the photomicrograph). When a cut surface was photographed, the surface of each honeycomb structural body which was vertical to the cell extending direction was photographed at a magnification of 100 times. In FIG. 6B, FIG. 7B, FIG. 8B, FIG. 9B and FIG. 10B, the surface of the partition wall disposed to form the cell is reflected in the section of the honeycomb structural body cut in parallel with the cell extending direction. The surface of the partition wall was photographed at a magnification of 100 times.

Results

As shown in Table 1 and FIG. 5, it is seen that in the case of the same degree of porosity, the honeycomb structural bodies of Examples 1 to 6 have a higher strength (A-axis compressive strength) as compared with the honeycomb structural bodies of Comparative Examples 1 to 9. In other words, when the honeycomb structural bodies maintain the same degree of strength (A-axis compressive strength) as the honeycomb structural bodies of Comparative Examples 1 to 9, the porosity of the honeycomb structural bodies can be raised. When the porosity of the honeycomb structural body is high, a larger amount of catalyst (e.g. the zeolite) can be loaded into the pores of the partition walls.

INDUSTRIAL APPLICABILITY

A honeycomb structural body of the present invention can be utilized as a catalyst carrier for loading a catalyst.

DESCRIPTION OF REFERENCE NUMERALS

1: partition wall, 2: cell, 3: outer peripheral wall, 11: one end surface, 12: the other end surface, and 100: honeycomb structural body.

The invention claimed is:

1. A honeycomb structural body comprising:
porous partition walls arranged to form a plurality of cells which become through channels of a fluid,
wherein porosities of the partition walls are from 45 to 70%,
a pore diameter distribution of the partition walls is measured by mercury porosimetry, the pore diameter distribution indicates a bimodal distribution, in the bimodal distribution, a pore diameter at the maximum peak value of a small pore side distribution is from 1 to 10 μm, and a pore diameter at the maximum peak value of a large pore side distribution exceeds 10 μm,
a ratio between a pore volume of the small pores and a pore volume of the large pores is in a range of 1:7 to 1:1, and
a catalyst is loaded on the partition walls in an amount of 150-300 g/L.

2. The honeycomb structural body according to claim 1, wherein the pore diameter at the maximum peak value of the large pore side distribution exceeds 10 μm and is 200 μm or smaller.

3. The honeycomb structural body according to claim 2, wherein a thickness of each of the partition walls is from 0.060 to 0.288 mm.

4. The honeycomb structural body according to claim 3, wherein the partition walls are made of a material containing at least one ceramic component selected from the group consisting of silicon carbide, a silicon-silicon carbide based composite material, cordierite, mullite, alumina, spinel, a silicon carbide-cordierite based composite material, lithium aluminum silicate, and aluminum titanate.

5. The honeycomb structural body according to claim 4, wherein a cell density of the honeycomb structural body is from 15 to 140 cells/cm$^2$.

6. The honeycomb structural body according to claim 3, wherein a cell density of the honeycomb structural body is from 15 to 140 cells/cm$^2$.

7. The honeycomb structural body according to claim 2, wherein the partition walls are made of a material containing at least one ceramic component selected from the group consisting of silicon carbide, a silicon-silicon carbide based composite material, cordierite, mullite, alumina, spinel, a silicon carbide-cordierite based composite material, lithium aluminum silicate, and aluminum titanate.

8. The honeycomb structural body according to claim 7, wherein a cell density of the honeycomb structural body is from 15 to 140 cells/cm$^2$.

9. The honeycomb structural body according to claim 2, wherein a cell density of the honeycomb structural body is from 15 to 140 cells/cm$^2$.

10. The honeycomb structural body according to claim 1, wherein a thickness of each of the partition walls is from 0.060 to 0.288 mm.

11. The honeycomb structural body according to claim 10, wherein the partition walls are made of a material containing at least one ceramic component selected from the group consisting of silicon carbide, a silicon-silicon carbide based composite material, cordierite, mullite, alumina, spinel, a silicon carbide-cordierite based composite material, lithium aluminum silicate, and aluminum titanate.

12. The honeycomb structural body according to claim 11, wherein a cell density of the honeycomb structural body is from 15 to 140 cells/cm$^2$.

13. The honeycomb structural body according to claim 10, wherein a cell density of the honeycomb structural body is from 15 to 140 cells/cm$^2$.

14. The honeycomb structural body according to claim 1, wherein the partition walls are made of a material containing at least one ceramic component selected from the group consisting of silicon carbide, a silicon-silicon carbide based composite material, cordierite, mullite, alumina, spinel, a silicon carbide-cordierite based composite material, lithium aluminum silicate, and aluminum titanate.

15. The honeycomb structural body according to claim 14, wherein a cell density of the honeycomb structural body is from 15 to 140 cells/cm$^2$.

16. The honeycomb structural body according to claim 1, wherein a cell density of the honeycomb structural body is from 15 to 140 cells/cm$^2$.

17. The honeycomb structural body according to claim 1, wherein the catalyst is a zeolite ion-exchanged with Cu or Fe ions.

* * * * *